US011341502B1

United States Patent
Hill et al.

(10) Patent No.: US 11,341,502 B1
(45) Date of Patent: May 24, 2022

(54) SYSTEMS AND METHODS FOR COMPLETING TRANSACTIONS VIA LOCKBOXES

(71) Applicant: Wells Fargo Bank, N.A., San Francisco, CA (US)

(72) Inventors: Miranda C. Hill, Seattle, WA (US); Alicia Y. Moore, San Ramon, CA (US); Susan Symons, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 209 days.

(21) Appl. No.: 15/466,706

(22) Filed: Mar. 22, 2017

Related U.S. Application Data

(60) Provisional application No. 62/318,054, filed on Apr. 4, 2016.

(51) Int. Cl.
*G06Q 20/40* (2012.01)
*G07C 9/00* (2020.01)

(52) U.S. Cl.
CPC ....... *G06Q 20/405* (2013.01); *G07C 9/00912* (2013.01)

(58) Field of Classification Search
None
See application file for complete search history.

(56) References Cited

U.S. PATENT DOCUMENTS

| | | | |
|---|---|---|---|
| 5,987,439 A * | 11/1999 | Gustin | G06Q 20/04 235/379 |
| 7,185,804 B1 | 3/2007 | Rozlosnik et al. | |
| 7,545,816 B1 | 6/2009 | Coutts et al. | |
| 8,162,125 B1 * | 4/2012 | Csulits | G07D 7/0047 194/206 |

(Continued)

OTHER PUBLICATIONS

"Luke Stark, Matt Tierney, Lockbox: mobility, privacy and values in cloud storages (2013) Springer Science + Business Media Dordrecht, 2014 edition, 2-3" (Year: 2013).*

(Continued)

*Primary Examiner* — Christopher Bridges
*Assistant Examiner* — Toan Duc Bui
(74) *Attorney, Agent, or Firm* — Foley Lardner LLP

(57) ABSTRACT

A method performed by a processor of a financial institution computing system includes allowing an account holder at the financial institution to initiate a transaction with the financial institution remotely (e.g., via smartphone, online banking, etc.), by submitting a request for a specified transaction to be picked up in a lockbox at a financial institution's lockbox location. The pickup and completion of the account holder's requested transaction occurs at a lockbox location that has a plurality of lockboxes. The lockbox allows the account holder to access the facility at the account holder's leisure, both in time and location. The lockbox pickup service alleviates the uncertainty, fluctuating time cost, and inconvenient operating hours by allowing the account holder to request transactions with an easy to use (Continued)

interface resulting in a lockbox to be accordingly prepped so that the account holder can provide the proper authentication information and access the lockbox.

16 Claims, 8 Drawing Sheets

(56) References Cited

U.S. PATENT DOCUMENTS

| | | | |
|---|---|---|---|
| 8,577,805 B1* | 11/2013 | Oakes, III | G06Q 20/351 |
| | | | 705/45 |
| RE45,012 E | 7/2014 | Jones et al. | |
| 9,141,876 B1 | 9/2015 | Jones et al. | |
| 9,558,636 B1 | 1/2017 | Burdick | |
| 9,822,553 B1* | 11/2017 | Ho | E05B 47/0012 |
| 9,996,999 B2 | 6/2018 | Conrad et al. | |
| 10,354,246 B1* | 7/2019 | Janiga | G06Q 20/3274 |
| 10,474,986 B1 | 11/2019 | Phillips et al. | |
| 10,482,420 B1 | 11/2019 | Brooks et al. | |
| 2001/0042024 A1 | 11/2001 | Rogers | |
| 2002/0003163 A1* | 1/2002 | Peebles | G07D 11/14 |
| | | | 235/379 |
| 2002/0161652 A1* | 10/2002 | Paullin | B65D 79/00 |
| | | | 705/22 |
| 2003/0115148 A1* | 6/2003 | Takhar | G06Q 20/382 |
| | | | 705/64 |
| 2007/0096870 A1 | 5/2007 | Fisher | |
| 2008/0301047 A1* | 12/2008 | Fish | G06Q 20/1085 |
| | | | 705/41 |
| 2009/0108988 A1* | 4/2009 | Cleveland | E05C 9/12 |
| | | | 340/5.52 |
| 2010/0066491 A1* | 3/2010 | Bohen | G07D 11/125 |
| | | | 340/5.51 |
| 2011/0191243 A1 | 8/2011 | Allen | |
| 2013/0060708 A1 | 3/2013 | Oskolkov et al. | |
| 2013/0124410 A1 | 5/2013 | Kay et al. | |
| 2013/0151267 A1* | 6/2013 | Mehdizadeh | G16H 20/13 |
| | | | 705/2 |
| 2013/0159121 A1 | 6/2013 | May et al. | |
| 2013/0261793 A1* | 10/2013 | Geller | G06Q 30/06 |
| | | | 700/234 |
| 2013/0307670 A1 | 11/2013 | Ramaci | |
| 2014/0144976 A1 | 5/2014 | Angus et al. | |
| 2014/0172703 A1 | 6/2014 | Black | |
| 2014/0351127 A1 | 11/2014 | McMullan et al. | |
| 2015/0269433 A1 | 9/2015 | Amtrup et al. | |
| 2016/0005284 A1 | 1/2016 | Batra et al. | |
| 2016/0014552 A1* | 1/2016 | Hanson | G06Q 20/3224 |
| | | | 455/456.3 |
| 2016/0048813 A1* | 2/2016 | Mauller | G06Q 40/12 |
| | | | 705/30 |
| 2016/0055694 A1* | 2/2016 | Saeedi | G07C 9/27 |
| | | | 340/5.52 |
| 2016/0167912 A1* | 6/2016 | Jeong | E05G 1/026 |
| | | | 271/3.14 |
| 2016/0267438 A1 | 9/2016 | Sobol et al. | |
| 2016/0277382 A1 | 9/2016 | Streuter et al. | |
| 2017/0178130 A1 | 6/2017 | Coburn | |
| 2018/0247481 A1 | 8/2018 | Gilbertson et al. | |
| 2018/0350170 A1 | 12/2018 | Wang et al. | |
| 2021/0027295 A1 | 1/2021 | Raquepaw et al. | |

OTHER PUBLICATIONS

Wikipedia, "change-making problem" https://web.archive.org/web/20150423104953/https://en.wikipedia.org/wiki/Change-making_problem, (Year: 2015).

Singapore Application No. 10201503531V.

"Meg Conlan-Donnelly, Pre-Staging Tech Improves the Speed and Security of Bank Transactions (2015), https://biztechmagazine.com/article/2015/09/pre-staging-tech-improves-speed-and-security-bank-transactions" (Year: 2015).

* cited by examiner

SYSTEMS AND METHODS FOR COMPLETING TRANSACTIONS VIA LOCKBOXES

CROSS-REFERENCE TO RELATED APPLICATIONS

This application claims priority to U.S. Provisional Patent Application No. 62/318,054 entitled "SYSTEMS AND METHODS FOR COMPLETING TRANSACTIONS VIA LOCKBOXES", filed Apr. 4, 2016, incorporated herein by reference in its entirety.

BACKGROUND

Financial institutions provide a plethora of financial services to customers to assist in the completion of transactions and to meet the needs of the customers. One service includes assisting with transactions that involve "in-hand" funds, for example, the withdrawal or deposit of cash. Currently, a customer may engage in the withdrawals and deposits of these funds by walking into a branch location of a financial institution and initiating the withdrawal or deposit request via interaction with a teller at the branch. However, the customer is only able to access the financial institution during operating hours, which are usually between the hours of 9 AM to 5 PM. Many customers may find these hours inconvenient and in conflict with their work schedules, requiring them to leave a job during the work day to complete the desired transaction. Some financial institution branch locations may offer an afterhours drop-box deposit service, but this is limited to availability and requires the customer to travel to a branch location that offers the service, the location possibly being far away from the customer's location. While a financial institution may have automated teller machines (ATMs) in various locations outside of a branch location to allow the customer, at any hour of the day, to withdraw cash after authenticating at the ATM, the type of transactions may be limited to just withdraws and deposits. Despite the ability to engage in these "in-hand" fund transactions inside branch locations and at ATMs, there is a need for more flexible systems and methods to engage in these transactions, more convenience, and a more time effective method to complete these transactions.

SUMMARY

Various embodiments relate to a method performed by a processor of a financial institution computing system. One example method includes receiving a lockbox pickup transaction request from an account holder to execute a transaction from a financial account of the account holder. The lockbox pickup transaction request includes at least one of a transaction type, a transaction amount, a transaction location, and a transaction time. A financial institution lockbox hub service call is generated, in response to the request. The lockbox hub service call including at least one of the transaction type, the transaction amount, the transaction location, and the transaction time. The lockbox hub service call is transmitted to the financial institution's lockbox system 106 that will be executing the transaction with the customer. The financial institution transmits a transaction details message to the account holder containing the pertinent details, including the transaction time window and location of the financial institution's lockbox. Once the transaction is completed at the financial institution's lockbox, the lockbox transmits a notification of the completed transaction to the financial institution's computing system. The financial institution adjusts the account holder's financial account accordingly.

Various other embodiments relate to a method performed by a processor of a financial institution's lockbox computing system. One example method includes receiving, from a financial institution computing system, a lockbox hub service call. The lockbox hub service call includes at least one of a transaction type, a transaction amount, a transaction location, a transaction time and a financial account of an account holder to use in the transaction. An arrival notification is received, the notification responsive to the account holder arriving at the financial institution lockbox. An account holder authentication is received to confirm the account holder who arrived at the lockbox is the account holder through which the lockbox hub service call was generated. A notification of completed transaction is generated and transmitted to the financial institution computing system.

Various other embodiments relate to a method performed by a processor of an account holder at a financial institution computing system. One example method includes transmitting a lockbox pickup transaction request to a financial institution computing system. The lockbox pickup transaction request including at least one of a transaction type, a transaction amount, a transaction location, a transaction time and a financial account of the account holder. A transaction details message is received, the transaction details message to the account holder containing the pertinent details, including the transaction time window and location of the financial institution's lockbox. An arrival notification is transmitted, the notification responsive to the account holder arriving at the financial institution lockbox. An account holder authentication is transmitted to confirm the account holder who arrived at the lockbox is the account holder through which the service call was generated. A notification of completed transaction is received indicating the transaction details and financial institution account information post transaction.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring generally to the figures, systems and methods for withdrawing, depositing and exchanging currency (e.g., U.S. dollars, euros, yen, etc.) via a lockbox pickup service using a primary fiat currency account are described. The embodiments described herein alleviate the time uncertainty and inconvenience associated with conducting currency transactions involving the physical passing of items (e.g., coins and bills) that are limited to a financial institution's operating hours. For example, various embodiments reduce the uncertainty of wait time and organize the transaction before the account holder arrives at the financial institution's lockbox location to complete the transaction. The described systems and methods enable account holders to easily engage in withdrawals, deposits, currency exchanges, and the like in accordance with the account holder's terms, time and schedule, at any one of the lockbox locations near the customer.

As described in further detail below, the account holder interacts with the financial institution, at the leisure of the account holder, to submit a request to complete a transaction via one of the financial institution's lockboxes. The account holder selects from a variety of options including a transaction type, a transaction amount, a transaction location, and a transaction time, in order to structure a transaction to the account holder's needs. For example, the account holder can interact with the financial institution via a financial institution application or website in real-time to receive open lockbox pickup transaction times and locations for all of the financial institution lockbox locations. On the back-end, the financial institution works with the available lockboxes to provide the account holder with the available time slots and locations to complete the account holder's transactions. Once a request is submitted, the financial institution sends a set of instructions to the lockbox location that hosts the selected lockbox, in order to facilitate the organization of the transaction items to complete the transaction. The account holder can submit the request on any web-enabled device, for example a desktop, laptop, cellphone, or other mobile computing devices. The request relates to a deposit of funds, a withdrawal of funds, an exchange of a first type of funds for a second type of funds (e.g., a foreign exchange transaction, an exchange of bills for coins, an exchange of coins for bills, etc.), or the like. Once the request is submitted, the financial institution identifies a suitable lockbox for the transaction, informs the account holder of the lockbox location and the transaction complete time, and configures the lockbox for completion of the transaction (e.g., by loading the lockbox with funds). Accordingly, the account holder will have certainty that, when arriving at the lockbox location at the designated date and time, the transaction can be completed.

Figure 1:
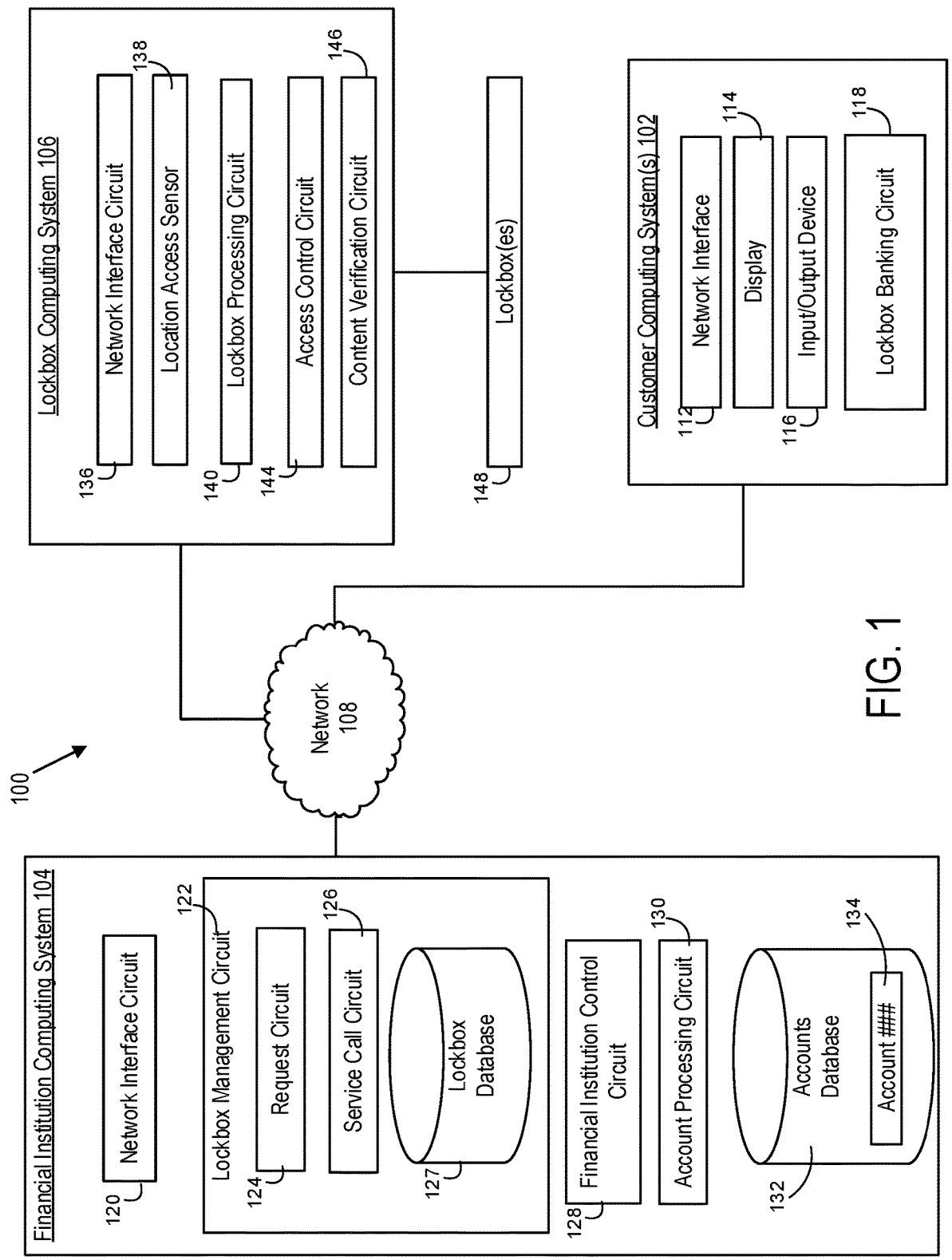
FIG. 1 is a schematic diagram of a lockbox pickup transaction processing system, according to an example embodiment.

FIG. 1 is a schematic diagram of a lockbox transaction request processing system 100, according to an example embodiment. The lockbox transaction request processing system 100 includes one or more customer computing system(s) 102, a financial institution computing system 104 associated with a financial institution (e.g., a bank), and a lockbox computing system 106. Each of the customer computing systems 102, the financial institution computing system 104, and the lockbox computing system 106 are in operative communication with each other via a network 108. The network 108 may include, for example, the Internet, cellular networks, proprietary banking networks, and the like. In some arrangements, the financial institution computing system 104 and the lockbox computing system 106 are in communication via a secure network or intranet.

Generally, customers (e.g., an account holder at the financial institution) may use the lockbox transaction request processing system 100 to submit a request to the financial institution computing system 104 to engage in a requested transaction at a lockbox located at one of the lockbox locations associated with the financial institution (e.g., the lockbox computing system 106). Through a user interface provided by the financial institution (e.g., via a smartphone application, via an online banking website, etc.), the customer can authenticate himself as an account holder with the financial institution, select a desired transaction type (e.g., withdrawal, deposit, exchange, etc.), provide relevant transaction details (e.g., amount of currency, type of currency, desired date and time of transaction), and identify a location of a lockbox 148 where the customer can complete the transaction at the customer's leisure (e.g., by selecting an available lockbox on the user interface, by affirming a financial institution suggested available lockbox, etc.). The financial institution computing system 104 automatically generates and executes commands to direct the lockbox location to complete the customer's request. The lockbox computing system 106 controls the lockboxes 148 at a given lockbox location. The lockbox computing system 106 is structured to configure a lockbox 148 at its location to be ready for the customer's transaction.

The customer computing systems 102 include a network interface circuit 112, a display 114, an input/output device 116, and a lockbox banking circuit 118. The network interface 112 is structured to facilitate operative communication between the customer computing systems 102 and other systems and devices over the network 108. The customer computing systems 102 can include any of smartphones, tablet computing systems, laptop computing systems, desktop computing systems, PDAs, smart watches, smart glasses, tablets, etc The display 114 is structured to present user interfaces to the account holders. For example, when customers use the customer computing systems 102 to access a financial institution application or website, the display 114 presents account information, transaction information, and the like, to the customers. The input/output device 116 is structured to receive input from the customer via the customer computing systems 102. In some arrangements, the display 114 and the input output device 115 are combined (e.g., as a touchscreen display). As described in further detail below, the input/output relates to lockbox transaction requests, location selection, personal information, and other information used to facilitate transactions between the financial institution, the customers, and the lockbox locations. The input/output device 116 can be used by the customer to provide transaction details (e.g., transaction type, lockbox location, transaction amount in U.S.D. currency or foreign currency, etc.) to be carried out by the financial institution computing system 104. The input/output device 116 may include a keyboard, a mouse, a touchscreen, a biometric sensor (e.g., a fingerprint sensor), a microphone, a camera, etc.

The lockbox banking circuit 118 is structured to provide the customer with a user interface to arrange for financial transactions with the financial institution via one of the lockboxes 148. For example, via the lockbox banking circuit 118, the customer can withdraw funds, deposit funds, exchange funds or complete similar transactions at a lockbox 148. The lockbox banking circuit 118 comprises program logic (e.g., stored executable instructions) structured to implement at least some of the functions described herein. In some arrangements, the lockbox banking circuit 118 is created by accessing a lockbox banking website via a web browser (e.g., Safari®, Chrome®, Internet Explorer®, etc.) structured to receive and display web pages received from the financial institution computing system 104. In other arrangements, the lockbox banking circuit 118 includes a dedicated application (e.g., a smartphone application), a text message interface, or another program suitable for communicating with the financial institution computing system 104 over the network 108 in order to facilitate the customers' ability to have a lockbox 148 prepped and ready for the customer specified transaction. The customer logs into his or her existing financial institution account by providing online banking credentials (e.g., a username and password) via the lockbox banking circuit 118 and submit a lockbox transaction request, with available lockbox locations and pickup windows in response to the customer transaction type and customer location. The lockbox banking circuit 118 can also provide the customer with transaction details including lockbox location, lockbox number, or any passcode information. Example interfaces generated by the lockbox banking circuit 118 for display to the customer via the display 114 are shown in FIGS. 5A-D.

In some arrangements, the financial institution computing system 104 provides the lockbox banking circuit 118 in part through a software application made available for download and installation on the customer computing systems 102 (e.g., via the online banking website of the bank, via an app store, or in another manner). Responsive to a user selection of an appropriate link, the lockbox banking circuit 118 is transmitted to the customer computing system 102 from the financial institution computing system 104 and cause itself to be installed on the customer computing system 102. After installation, the thus-modified customer computing system 102 includes the lockbox banking circuit 118 for requesting a lockbox transaction through the customer's deposit account (embodied as a processor and instructions stored in non-transitory memory that are executed by the processor).

The financial institution computing system 104 includes a network interface circuit 120, a lockbox management circuit 122, a financial institution control circuit 128, an account processing circuit 130, and an account database 132. The financial institution computing system 104 may, for example, comprise one or more servers each with one or more processors configured to execute instructions stored in a memory, send and receive data stored in the memory, and perform other operations to implement the financial services described herein associated with the processing modules, databases, and processes. The financial institution computing system 104 may also provide banking services that include demand deposit accounts, credit services, loan services, investment services, and the like.

The network interface 120 is structured to facilitate operative data communication between the financial institution computing system 104 and other systems and devices over the network 108 (e.g., the customer computing systems 102, the lockbox computing system 106, etc.).

The lockbox management circuit 122 is structured to facilitate the back-end process necessary to conduct lockbox transaction via the customer's financial account 134. For example, the lockbox management circuit 122 is structured to receive, generate and send instructions (e.g., based on a customer transaction request) to a given lockbox 148 via the lockbox computing system 106 to facilitate the requested transaction. The lockbox management circuit 122 includes the request circuit 124, the service call circuit 126 and a lockbox database 127.

The request circuit 124 is structured to receive and process a customer transaction request to engage in the lockbox service. The request circuit 124 has access to the lockbox database 127. The lockbox database 127 contains all information regarding the locations of the lockboxes 148, the lockbox types, the lockbox availability, lockbox location currencies supply and other information related to attributes of a customer transaction request. For example, the request circuit 124 is initiated in response to the customer opening the lockbox banking circuit 118 on the customer computing system 102 and initiating a lockbox transaction request. In some arrangements, the request circuit 124 is in real-time communication with the customer interface such that the information fields for the request displayed on a given customer computing system 102 updates in response to the customer entries. For example, if the customer were to select the exchange currency option and enter the customer's zip code, the request circuit 124 determines, by accessing the lockbox database 127, that out of the plurality of lockbox locations near the customer's location, only two of the locations could complete the requested transaction. The request circuit 124 could limit the display of the lockbox locations to those two lockboxes 148. In other arrangements, the request circuit 124 receives all the relevant transaction request details (e.g., transaction type, lockbox location, transaction amount in U.S.D. currency or foreign currency, etc.) and then makes the determination of feasibility. For example, the request circuit 124 could receive a transaction request for a withdrawal of 20 U.S.D., by 5:00 PM at the lockbox location on 123 Street. The request circuit 124 could access the lockbox database 127 and determine that the user-submitted location is capable of completing the requested transaction, resulting in the request circuit 124 approving that transaction. Alternatively, the request circuit 124 could determine that the requested lockbox location would not be able to complete the requested transaction, and the request circuit 124 could deny the request or provide to the requesting customer alternative locations or times that could complete the transaction.

Upon approval of a request by the request circuit 124, the service call circuit 126 is structured to generate and transmit the transaction instructions (e.g., transaction type, passcode information, transaction amount in U.S.D. currency or foreign currency, etc.) to the lockbox computing system 106. The lockbox computing system 106 is located at a lockbox location that has one or more lockboxes 148. For example, a single lockbox computing system 106 may control the operation of a plurality of lockboxes 148 located in a convenience store, in a bank branch lobby, or the like. The service call circuit 126 is also in communication with the lockbox database 127. The service call circuit 126 identifies a specific lockbox 148 and organizes the passcode information for the transaction request based on the information in the lockbox database 127. For example, the request circuit 124 can compile and provide the finalized request information to the service call circuit 126 which in turn assigns a lockbox 148 at the lockbox location for the transaction and generates a passcode type for the lockbox lock. The service call circuit 126 includes a command to lock the lockbox number in accordance with the passcode information. In some arrangements, the service call circuit 126 can be structured to transmit the finalized transaction details, including the lockbox number and passcode information, to the customer computing system 102. As will be appreciated, the service call circuit 126 can be structured to communicate with or control a delivery mechanism (e.g., human worker at the branch, automated dispenser, autonomous device, drone, and the like).

The financial institution control circuit 128 is structured to facilitate authentication of a requesting customer at a lockbox location (e.g., at a specific lockbox 148, at the lockbox computing system 106, etc.). The financial institution control circuit 128 is in communication with the access control circuit 144 of the lockbox computing system 106 to determine whether the passcode and information provided at a lockbox 148 in a lockbox location is correct, in order to grant the requesting person access to the lockbox contents. In some embodiments, the financial institution control circuit 128 facilitates the storage of the lockbox passcode, customer identification and associated lockbox number for all lockbox transaction requests, authenticating a request event at a lockbox 148 captured and transmitted by the access control device 140. The information can be stored in the lockbox database 127, the accounts database 132, or either location. In some arrangements, the financial institution control circuit 128 receives a completed transaction details from the lockbox computing system 106, the completed transaction details including the remaining contents of the lockbox 148 to adjust the customer's financial account accordingly. An example embodiment of the financial institution control circuit 128 is described in FIG. 2, which is described in further detail below.

The account processing circuit 130 is structured to track, maintain and incorporate transaction details for an account enrolled in the lockbox transaction service with the financial institution. The account processing circuit 130 interacts with the lockbox management circuit 124 and the financial institution control circuit 128 to properly adjust the customer's financial account. In some arrangements, the account processing circuit 130 debits or credits the customer's financial account when the lockbox management circuit 124 completes a request, in order to prevent double usage or early usage of the transaction funds. Upon the financial institution control circuit 130 receiving the completed transaction details, the account processing circuit 130 finalizes the adjustment of the customer's financial account (if applicable). The account processing circuit 130 can also check to ensure that the customer is authorized to use the customer's existing financial account to use the lockbox transaction service. Additionally, the account processing circuit 130 stores all transaction information in an accounts database 132 within the financial institution computing system 102. In some embodiments either the lockbox computing system 106 or the financial institution computing system 104 keeps track of all the lockbox transaction that are submitted and completed by a customer, in order to comply with any regulatory rules. In other embodiments, both the financial institution and the lockbox computing systems 104, 106 keep track of the transaction history, comprising the details from request submission to completion by the customer.

The financial account database 132 is structured to store account information and transaction records for a plurality of customers of the financial institution. The accounts database 132 stores, for example, information regarding an account holder's, age, membership date, account numbers and type of accounts held by the customer, various statements (e.g., credit/debit statements for the accounts), passcode information, and so on for a plurality of account holders. The account database 132 stores details regarding types of accounts held within a financial institution, the type of account holder, whether he or she is authorized for the lockbox transactions, information and video of each lockbox transaction, and so on for a plurality of customers. A specific account 134 may have a multi-use passcode, for example, a lockbox fob or a biometric sample, that is stored in the accounts database 132 and used by the financial institution control circuit 128 to authenticate a customer. In particular, the account database 132 stores each transaction that occurred, and each payment includes the amount of the transaction, the transaction type and the source of the transaction.

The lockbox computing system 106 includes a network interface circuit 136, a location access sensor 138, a lockbox processing circuit 140, a lockbox database 142 an access control circuit 144, a content verification circuit 146. Generally, the lockbox computing system 106 controls the operation of and access to a plurality of lockboxes 148. The lockbox computing system 106 facilitates the instructions generated by the financial institution for a requested transaction. The lockbox computing system 106 is structured to receive a service call from the financial institution computing system 104, configure a lockbox 148 at the given lockbox location in accordance with the transaction details, and facilitate the authentication and completion of the transaction at the lockbox 148 when the customer arrives. In some arrangements, the lockbox computing system 106 controls a plurality of lockboxes 148 at a given location of lockboxes 148. For example, a building containing fifty lockboxes is controlled by a first lockbox computing system 106 connected to the financial institution computing system 104, and another location containing ten lockboxes is controlled by a second lockbox computing system 106 connected to the financial institution computing system 104. In other arrangements, the lockbox computing system 106 controls facilitating the instructions to, authentication and unlocking of all of the lockboxes 148 in the service. In some arrangements, each lockbox computing system 106 is associated with a single lockbox 148.

The network interface 136 structured to facilitate operative data communication between the lockbox computing system 106 and other systems and devices over the network 108 (e.g., the customer computing systems 102, the financial institution computing system 104, etc.).

The location access sensor 138 is structured to grant access to the lockbox location to a requesting entity. In some arrangements, the customer cannot access the lockboxes 148 until the customer authenticates, and is granted access, to the lockbox location facility. For example, there may be a locked door that requires the customer to swipe a credit or debit card issued by the financial institution to unlock the door to the lockbox facility. The location access sensor 138 is in communication with the financial institution computing system to gain access to the requesting customer's passcode and account information in order to authenticate the customer.

The lockbox processing circuit 140 is structured to track, maintain, and incorporate lockbox transaction details for an account enrolled in the lockbox transaction service with the financial institution. The lockbox processing circuit 140 is structured to receive a service call from the lockbox transaction service call circuit 126 from the financial institution computing system 104. Upon receiving the transaction service call, the lockbox processing circuit 140 ensures the lockbox 148 at the lockbox location is ready for the customer. For example, the lockbox processing circuit 140 facilitates a print out of a transaction request instruction on a computer screen of an employee at the lockbox location. The employee would then load the lockbox 148 in accordance with the instructions, for example, placing an amount of U.S.D. into a lockbox 148 and setting the passcode for the lockbox 148. In some arrangements, the lockbox processing circuit 140 is operably connected to a processor that controls the lockboxes 148, wherein the contents of the lockbox 148 are loaded through an automated service. In some embodiments, a combination of employee interaction and automated actions are utilized to get the lockbox 148 ready for the customer requested transaction.

The access control circuit 144 is structured to receive an authentication request at the lockbox computing system 106 that manages the lockbox location and the access control circuit 144 determines whether to grant the requestor access to the lockbox 148. The access control circuit 144 is in communication with the financial institution control circuit 128 of the financial institution computing system 104 to determine whether the passcode and information provided at a lockbox 148 in a lockbox location is correct, in order to grant the requesting person access to the lockbox 148 contents. The access control circuit 144 is operably connected to the lockboxes 148. In some embodiments, one access control circuit 144 controls a plurality of lockboxes 148. In other embodiments, one access control circuit 144 controls a single lockbox 148. In some arrangements, the access control circuit 144 transmits a completed transaction details to the financial institution computing system, the completed transaction details including the remaining contents of the lockbox 148 to adjust the customer's financial account accordingly. In some arrangements, the access control device contains the customer identification and the customer passcodes for the lockbox transactions. An example embodiment of the access control circuit 144 is further described in FIG. 2.

The content verification circuit 146 is structured to examine the contents of a lockbox 148. The content verification circuit 146 is set up to ensure the proper transaction materials are placed in the lockbox 148 and/or removed from the lockbox 148. For example, the content verification circuit may be set up to an ATM-like device that dispenses a currency amount into a lockbox 148 to satisfy a withdrawal request or can receive an amount of currency to satisfy a deposit request or exchange request. Accordingly, the content verification circuit 146 may include any of bill dispensers, coin dispensers, bill receivers, coin receivers, cameras, and the like. The content verification circuit 146 is set up to alert the receipt or placement of currency into a lockbox 148. For example, the content verification circuit 146 could be operably connected to a sensor that generates an alert when an amount of currency is removed from the lockbox 148. The content verification circuit 146 determines that the transaction has been completed and locks the lockbox 148.

The lockboxes 148 are structured to be a secure receptacle to complete the transaction. Each lockbox 148 is connected to the access control circuit 144 and the content verification circuit 146 of the lockbox computing system 106 to facilitate the locking and unlocking of the lockbox 148. The lockbox 148 can be configured to facilitate a variety of transactions. An example embodiment of the lockbox 148 is further described below with respect to FIG. 2.

Figure 2:
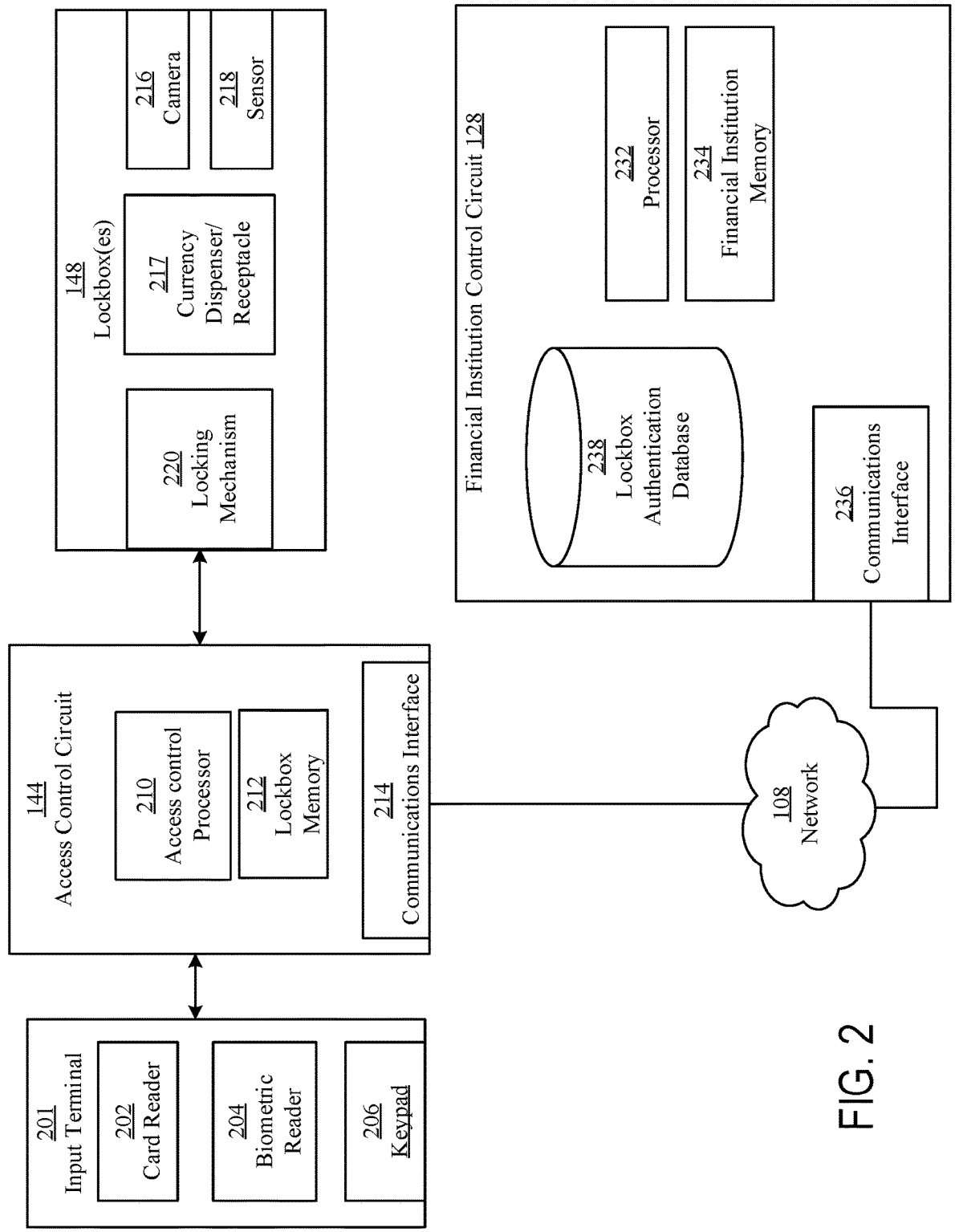
FIG. 2 is a detailed view of an access control device and its interactions with the lockboxes and the financial institution computing system.

Referring now to FIG. 2, a detailed view of the access control circuit 144 and its interactions with the lockboxes 148 and the financial institution computing system 104 is shown according to an example embodiment. The access control circuit 144 is operably connected to at least one lockbox 148 and to the financial institution control circuit 128 via the network 108. The access control circuit 144 is located at a location containing a plurality of lockboxes 148 and is connected to and controls the unlocking at each lockbox 148 in the location. The access control circuit 144 controls the unlocking/locking of a lockbox 148 via the locking mechanism 220. The financial institution control circuit 128 is located in a financial institution computing system 104 off-site from the lockbox location.

The lockbox 148 is structured to facilitate a transaction, for example, a withdrawal, a deposit or a currency exchange. In some arrangements, the lockbox 148 includes a camera 216, a sensor 218 and a locking mechanism 220. In some arrangements, the lockbox 148 has an ATM-like device 217 inside of it to facilitate the transaction (e.g., as described above with respect to FIG. 1). For example, if the customer requested a withdrawal transaction, a device could dispense the amount of U.S.D. that the customer requested. In a deposit transaction, a device could allow the customer to insert the currency, for example utilizing an apparatus that takes in paper and coin currency and is able to determine the type and amount of the currency. In exchange transactions, both mechanisms can be used in tandem, the receiving apparatus to take and determine the customer provided U.S.D. and the dispensing apparatus to provide the customer with the equivalent amount of foreign currency. The device could be connected to a repository of currency or each lockbox 148 could store the currency within itself, being loaded by an employee at the lockbox location or through automated mechanisms. In other arrangements, the lockbox 148 could contain open space for which the customer can place currency, remove currency, or, in exchange transaction, remove and place currencies. For example, the lockbox could be similar to a locker. A lockbox location has a plurality of lockbox types, with different mechanisms or features in a single lockbox 148 to facilitate certain types of transactions. In some arrangements, the customer could request a lockbox type in addition to their transaction details.

The lockbox 148 could be constructed to incorporate the various passcode options and the plurality of input devices, 202, 204, 206 instead of having a central input terminal. In some arrangements, the outside of the lockbox 148 has a biometric sensor, a card reader, a keypad, a bar code sensor, a fob sensor, or the like. In other arrangements, there is a single input terminal for the lockbox location that allows for a customer to select a lockbox number and provide the authentication input. In some arrangements, the passcode options available to the customer are limited to the available lockbox authentication devices on the lockboxes 148 at the selected lockbox location.

The locking mechanism 220 controls access to the lockbox 148. The locking mechanism 220 may include an electronic lock, latch, or other mechanism configured to lock, unlock, open, close, or otherwise control access through an access point. In some embodiments, the locking mechanism 220 includes a solenoid, motor, actuator, or other mechanical device configured to physically lock or unlock a door or other access point. In some embodiments, locking mechanism 220 includes a magnetic lock configured to selectively power and de-power an electromagnet that holds a door in a locked position. The access control circuit 144 receives access requests via the card reader 202 or other user input devices (e.g., by receiving or reading a security credential from a user or user device). The access control circuit 144 processes the access requests using the access control processing circuit 210 and generates access request events. The access request events may include timestamps, access control device IDs, security credentials, user IDs, or any other information describing the access requests. The access control circuit 144 sends the access request events to the financial institution control circuit 128 via the network 108. In response to the financial institution control circuit 128, the access control circuit 144 operates the locking mechanism to allow or deny access to the lockbox 148.

Upon completion of a granted access event (e.g., removal of currency, placement of currency, etc.), the lockbox 148 can be automatically re-locked.

The camera 216 is any device that records the lockbox 148 during the transaction. The camera 216 may be situated in view of an array of lockboxes 148 in the lockbox location, it may be situated inside or outside of the lockbox 148. In some arrangements, there are a plurality of cameras 216 associated with the lockbox 148 and the lockbox location. In such arrangements, cameras may be placed both inside of the lockbox 148 and in the surrounding area such that transactions can be monitored. In some embodiments, the camera 216 is not triggered until the customer begins to input a passcode into a lockbox 148 or into the lockbox computing system 106. In other arrangements, the camera is constantly monitoring the location and the lockboxes 148. In some embodiments, the video captured by the camera 216 during the transaction is parsed out and sent to the financial institution along with the completed transaction details.

The sensor 218 can be any device inside the lockbox 148 to facilitate the transaction. In a deposit transaction, the sensor could allow the customer to insert the currency, for example utilizing an apparatus that takes in paper and coin currency and is able to determine the type and amount of the currency. In exchange transactions, both mechanisms can be used in tandem, the receiving apparatus to take and determine the customer provided U.S.D. and the dispensing apparatus to provide the customer with the equivalent amount of foreign currency. In some embodiments, the lockbox 148 has a sensor that can determine when currency is removed or placed into the lockbox 148, for example a pressure sensor. When detecting a change in the weight of the lockbox 148 following an access event, the sensor 218 will communicate to the access control circuit 144 the change, in order to re-lock the lockbox 148. In some arrangements, there is no sensor in the lockbox 148 and a lockbox location employee inspects the lockbox 148 after the transaction to ensure that it was carried out in accordance with the customer request. In some embodiments, the sensor 218 is connected to the ATM-like receiving and dispensing currency device 217. For example, the sensor 218 is set up to alert the receipt or placement of currency into a lockbox 148 or generates an alert when an amount of currency is removed from the lockbox 148 via the currency device 217.

The access control circuit 144 is connected to the lockbox 148 and an input terminal 201 containing a plurality of input devices, 202, 204, 206. The access control circuit 144 is structured to authenticate an input terminal 201 access request by a customer at a lockbox location and determine whether to unlock the lockbox 148. As shown in FIG. 2, the access control circuit 144 contains an access control processor 210, lockbox memory 212, a communication interface 214, and a locking mechanism 220. In some arrangements, the access control circuit 144 may have a single input terminal 201 for receiving customer input, the single input terminal being connected to the locking mechanisms of all the lockboxes 148 at the location. In other arrangements, the access control circuit 144 may be operably connected to input devices that reside on each individual lockbox 148. The plurality of input devices includes a card reader 202 (e.g., an IC card reader), a biometric reader 204, and a keypad 206. The access control circuit 144 uses the input devices to receive input from a customer or from a security device possessed by the customer. For example, the card reader 202 is configured to read a smartcard possessed by a customer and automatically obtain a card ID from the smart card. Using either the card reader 202 or the keypad 206 the customer can input their user identification to provide the access control system 128 with the details to retrieve the passcode for the specific transaction. The biometric sensor 204 is structured to read a fingerprint, voice print, or other biometric marker. The keypad 206 is configured to receive an access code or other security credential from a user. In some embodiments, other inputs could be received by the customer, including a bar code scanner, a near field communication device, or a key fob. In some arrangements, a customer may have to provide two levels of authentication at the plurality of input devices. For example, the customer needs to use a card reader 202 to gain access to the lockbox location, and then use a keypad 206 attached to the individual lockbox 148 to gain access to the lockbox 148 contents.

The access control processor 210 is connected to a lockbox memory 212 and is structured to receive a password at one of the lockbox's 148 in a lockbox location and determine whether to grant access to the lockbox 148 to the requesting party. The access control processor 210 may be a general purpose or specific purpose processor, an application specific integrated circuit (ASIC), one or more field programmable gate arrays (FPGAs), a group of processing components, or other suitable processing components. The access control processor 210 is structured to execute computer code or instructions stored in memory 212 or received from other computer readable media (e.g., CD-ROM, network storage, a remote server, etc.). When the processor 210 executes instructions stored in the lockbox memory 212, the processor generally structures the access control processor 210 to complete such activities. The lockbox memory circuit 212 stores instructions related to receiving and transmitting an lockbox access request. The memory circuit 212 can also be structured to contain instructions for examining a lockbox 148 after it has been accessed by communicating with a the sensor 218. For example, following an access event at the lockbox 148 configured for a deposit request, the sensor 218 determines if the lockbox 148 contains currency by examining the change in weight from pre-access to post-access.

The communication interface 214 is structured to provide communications with the access control system 128 over the network 108. The communications interface 214 may include wired or wireless interfaces (e.g., jacks, antennas, transmitters, receivers, transceivers, wire terminals, etc.) for conducting data communications with various systems, devices, or networks. For example, the communications interface 214 can include an Ethernet card and port for sending and receiving data via an Ethernet-based communications network. As another example, the communications interface 424 includes a WiFi transceiver for communicating via a wireless communications network. The communications interface 214 may be structured to communicate via local area networks (e.g., a building LAN), wide area networks (e.g., the Internet, a cellular network, etc.), and/or conduct direct communications (e.g., NFC, Bluetooth, etc.). In various embodiments, the communications interface 214 is configured to conduct wired and/or wireless communications. For example, the communications interface 214 may include one or more wireless transceivers (e.g., a WiFi transceiver, a Bluetooth transceiver, a NFC transceiver, a cellular transceiver, etc.) for communicating with mobile devices, for example with an employee at the lockbox location.

Turning now to the financial institution control circuit 128 in FIG. 2. The financial institution control circuit 128 is shown to include a processor 212, financial institution memory 234, a communications interface 236 and a lockbox authentication database 238. The financial institution control circuit 128 is located within the financial institution computing system 104, as shown in FIG. 1. In some arrangements, the financial institution control circuit 128 is located within the lockbox computing system 106 at the lockbox location.

The communications interface 236 may include wired or wireless interfaces (e.g., jacks, antennas, transmitters, receivers, transceivers, wire terminals, etc.) for conducting data communications with various systems, devices, or networks. For example, the communications interface 236 can include an Ethernet card and port for sending and receiving data via an Ethernet-based communications network. As another example, the communications interface 236 may include a WiFi transceiver for communicating via a wireless communications network. The communications interface 236 is configured to communicate via local area networks (e.g., a building LAN), wide area networks (e.g., the Internet, a cellular network, etc.), and/or conduct direct communications (e.g., NFC, Bluetooth, etc.). In various embodiments, the communications interface 438 is configured to conduct wired and/or wireless communications. For example, the communications interface 236 includes one or more wireless transceivers (e.g., a WiFi transceiver, a Bluetooth transceiver, a NFC transceiver, a cellular transceiver, etc.) for communicating with mobile devices.

The lockbox authentication database 238 is plurality of passcode information for an account holder/customer who is one of the parties attempting to gain access to a lockbox 148. The database links a customer identifier to a plurality of authentication information that can be used to approve access to the lockbox 148. The customer identifier for an account 240 can be, for example, a customer name, email address, phone number, picture or actual name of the customer. The authentication information can be a customer's passcode, biometric sample, lockbox fob information, a token, and the like. The customer passcode for the lockbox 148 can be temporary, for example, a financial institution generated string, or a multi-use passcode for lockbox 148 or financial institution transactions. The lockbox authentication database 238 stores the passcode and transaction information for the lockbox transactions at the lockbox location. To accomplish this, the lockbox authentication database 238 is in communication with the lockbox processing circuit 140.

The processor 232 and financial institution memory circuit 234 are structured to receive a authentication request from an access control circuit 144 at one of the lockbox locations and determine whether the received passcode and information matches the authentication information in the financial institution's database. The financial institution control circuit 128 can determine whether to provide a positive or negative authentication value for the provided information of the requesting party. The processor 232 may be a general purpose or specific purpose processor, an application specific integrated circuit (ASIC), one or more field programmable gate arrays (FPGAs), a group of processing components, or other suitable processing components. The processor 232 is structured to execute computer code or instructions stored in memory 212 or received from other computer readable media (e.g., CD-ROM, network storage, a remote server, etc.). When the processor executes instructions stored in memory 234, the processor generally structures the circuit 128 to complete such activities. The financial institution memory circuit 234 stores instructions related to receiving and authorizing authentication information for a lockbox access request. In some arrangements, the processor 232 may transmit the relevant customer identifiers and passcode information to the access control circuit 144 upon confirmation of the customer transaction request. For example, it is included in a service call from the financial institution computing system 104 to the lockbox computing system 106, the service call including the transaction details, the lockbox information and the customer authentication information.

Figure 3:
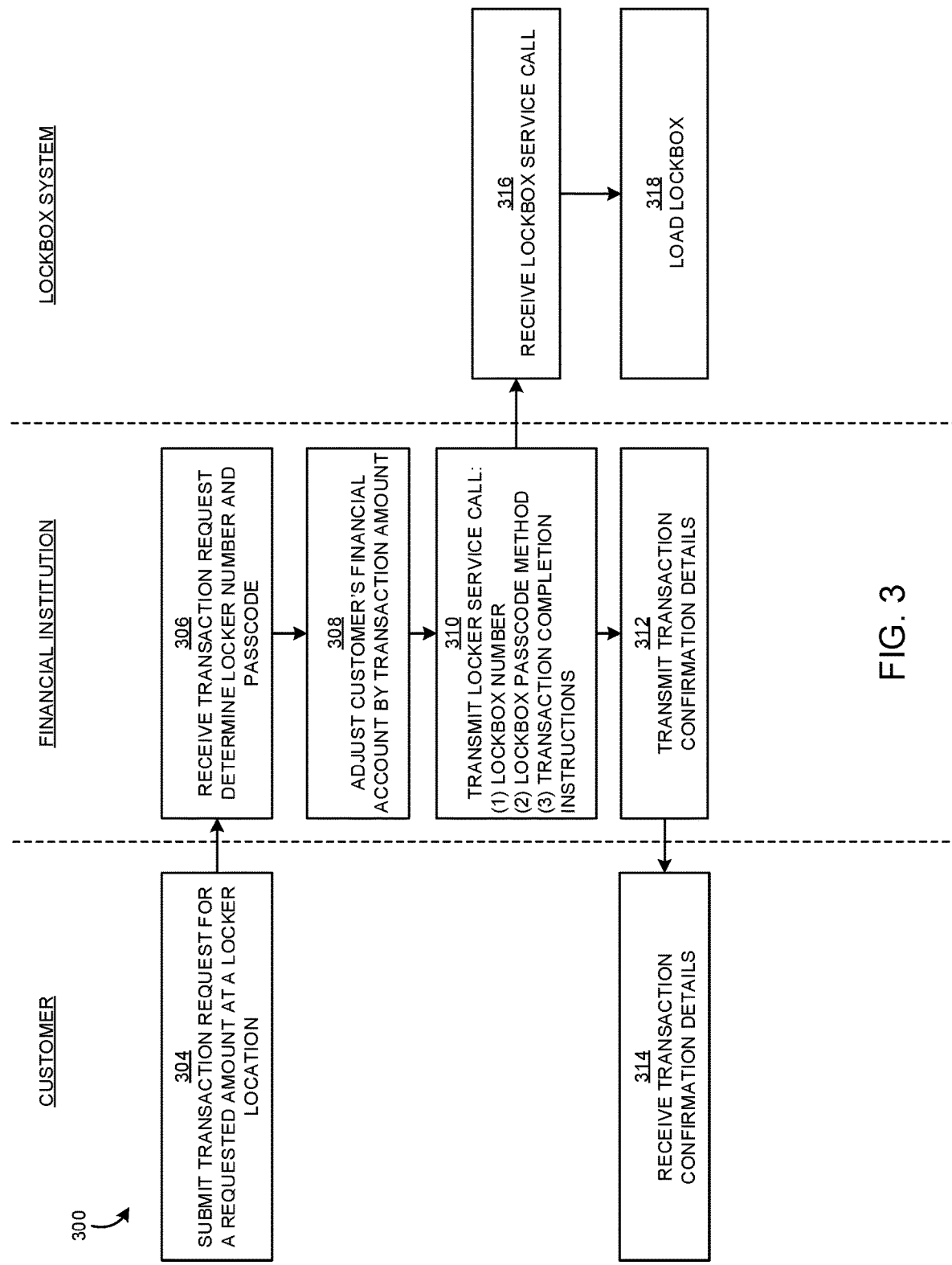
FIG. 3 is a flow diagram of a method of transmitting a lockbox pickup transaction request, according to an example embodiment.

Referring to FIG. 3 a flow diagram of a method 300 of transmitting a lockbox pickup transaction request is shown, according to an example embodiment. The method 300 is in connection with a customer (e.g., an account holder at the financial institution) and performed by a financial institution having a plurality of transaction lockboxes 148 at one or more lockbox locations. The financial institution is a financial institution that manages the financial institution computing system 104 of FIG. 1. The lockbox location is an entity that manages a plurality of lockboxes 148 at a lockbox location and manages the corresponding financial institution lockbox computing system 106 of FIG. 1.

At 304, a transaction request is transmitted from the customer to the financial institution. The customer device 102 transmits the transaction request to the financial institution computing system 104 via the network 108. The transaction request includes various details defining the parameters of a lockbox pickup transaction. For example, the transaction request includes a transaction type, a transaction amount, a lockbox location, a time window, and a financial account to use to facilitate the transaction. The transaction type can be a withdrawal, a deposit, a currency exchange or any other similar transactions involving the physical passing of items (e.g., coins and bills). For example, the customer could request an exchange, wherein the customer provides 100 U.S.D. at a designated lockbox 148 at a lockbox location in exchange for the equivalent amount in euros. In some arrangements, multiple transaction types are requested in a single request. In some embodiments, the lockbox location and time window can be determined by the financial institution computing system in real-time (i.e., the available lockbox locations on the user interface change, subject to availability) as the customer enters in the details. For example, the customer enters a currency exchange request and the financial institution may only have three lockbox locations that could complete the transaction on the day of the request. Alternatively, the financial institution may have no lockbox locations available for a transaction type for a given day, allowing the customer to only select future days in the time window field. In other embodiments, the customer submits a desired lockbox location and time window to the financial institution, and the customer receives a transaction request approval with the details, or a transaction request denial due to unavailability at the lockbox location at the specified time window.

At 306, the financial institution receives the transaction request from the customer. The request is transmitted from the customer computing system 102 and is received by the financial institution computing system 104 via the network 108. After receiving the request, the financial institution determines the feasibility of the transaction given the customer's parameters. For example, the financial institution may determine whether the requested lockbox location will be able to complete the withdrawal request between the 3:15 PM and 3:20 PM.

At 308, the financial institution adjusts the customer's financial account by the transaction amount (if necessary). The transaction amount includes the requested amount to be withdrawn or exchanged, and may also include fees associated with the transaction. Fees are any extra costs associated with the financial institution providing and carrying out the service. In some embodiments, the account may be tentatively adjusted, wherein the movement of the funds is shown in the account, but not yet finalized. For example, if the customer is withdrawing 100 U.S.D. from their account which has 1,000 U.S.D., upon submission of the request, the customer is only able to use 900 U.S.D. to initiate any subsequent transaction with that account as a source.

At 310, the financial institution transmits a service call to the financial institution's lockbox location to conduct the transaction. The financial institution computing system 106 transmits the service call to a lockbox computing system 106 in charge of the determined lockbox location. The service call includes several instructions regarding the transaction details, the lockbox number, the lockbox passcode and other transaction details. In an embodiment, the service call includes instructions to configure a lockbox 148 to get ready an amount of a currency to provide to the customer on arrival, for example in a withdrawal request. In other embodiments, the service call includes instructions to configure a lockbox 148 to collect a certain amount of a currency from the customer when unlocked. In some embodiments, the customer has to provide a passcode, for example an account password or a transaction specific passcode generated by the financial institution. In other arrangements, the customer may have to provide a biometric sample. In some embodiments, the customer has a fob for lockbox transaction that can be scanned at the lockbox 148 to authenticate the customer. In some arrangements, the service call to the lockbox location includes a command to store the pending transaction and locked configured lockbox 148 for a multiple amount of days, allowing the customer to complete the transaction at his or her leisure.

At 312, the financial institution transmits the transaction request confirmation details to the customer. The financial institution computing system 104 transmits the details to the customer computing systems 102, including the customer device, customer desktop, etc. The details include a transaction specific passcode or password for the customer to use to authenticate upon arrival at the lockbox location. In some arrangements, the details include information on how change or cancel a transaction request. At 314, the customer receives the transaction request confirmation details. The customer receives the transaction confirmation the next time he or she logs into his or her account, or it may be retrieved instantaneously through push notifications tied to the financial institution.

At 316, the lockbox computing system 106 that manages the chosen lockbox location receives the service call. In some embodiments, the lockbox location can alter the transaction details and send the changes to the financial institution, which in turn sends the update to the customer. For example, the lockbox location may have an unexpected issue that causes a delay in all the services, including the lockbox pickup service. At 318, the lockbox location prepares the transaction items. In some arrangements, the lockbox location may have to retrieve a-non U.S.D. currency from another location (e.g., another lockbox location or a currency exchange partner) ahead of the arrival of the customer. In other arrangements, the lockbox 148 is specifically constructed to complete the transaction type. In some arrangements, this is an ATM-like currency dispenser and receptacle. For example, if the transaction type is a currency exchange the lockbox 148 could be one that contains an ATM-like machine that will receive U.S.D. from the customer and upon verifying the amount deposited, the machine dispenses the equivalent amount in foreign currency. In other arrangements, an employee at the lockbox location receives an alert to load a lockbox 148 with the currency related to the customer's withdraw or exchange request. For example, the employee may open up the designated lockbox number, place the withdraw transaction funds into the lockbox 148, and lock the lockbox 148 using the passcode. As will be appreciated, the delivery mechanism to complete or organize the service call can include a human worker at the branch, automated dispenser, autonomous device, drone, and the like.

Figure 4:
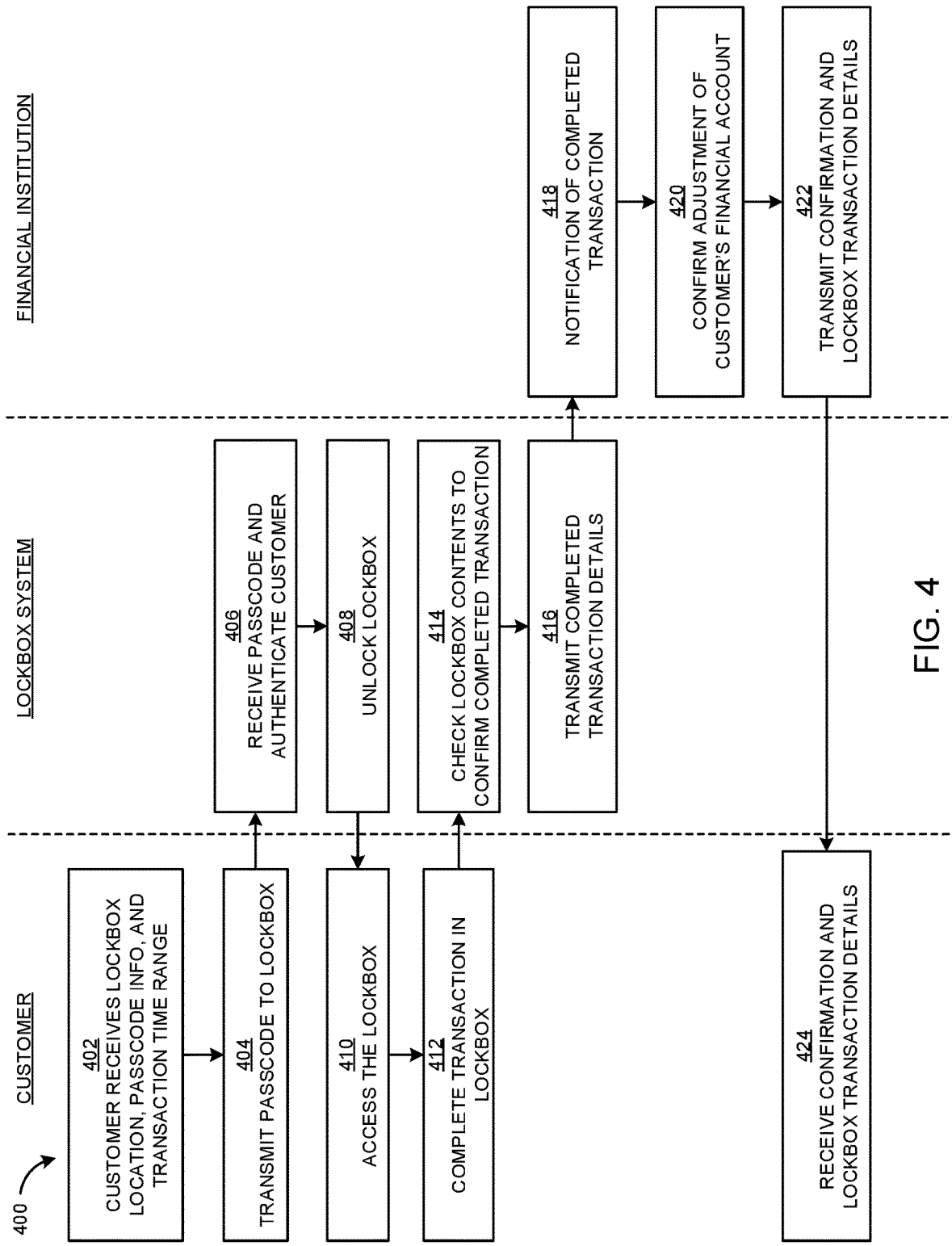
FIG. 4 is a flow diagram of a method of completing a lockbox pickup transaction request, according to an example embodiment.

Referring to FIG. 4, a flow diagram of a method 400 of completing a lockbox pickup transaction request is shown, according to an example embodiment. The method 400 may be performed in connection with the method 300 of FIG. 3. However, the method 400 may similarly be performed in connection with other types of transactions. The method 400 is shown in connection with a customer, a lockbox location of the financial institution, and a financial institution. For example, the customer may be an individual who operates the customer computing system 102 of FIG. 1. The lockbox location may be an entity that manages the financial institution lockbox computing system 106 of FIG. 1. The financial institution may be a financial institution that manages the financial institution computing system 104 of FIG. 1. However, the method 400 may be similarly performed by other systems and devices.

At 402, the customer receives the transaction request confirmation details. The customer device 102 receives the transaction request confirmation from the financial institution computing system 104 via the network. The transaction request confirmation details can include a lockbox location, any passcode authentication information, and a transaction time range. For example, the customer receives lockbox location street address and a designated lockbox number to access, a password of "password 123" which is needed to complete the withdrawal request, and a time window of after 1:15 PM. As described above in connection with step 312 of the method 300 of FIG. 3, the transaction request may include various details defining the parameters of the lockbox pickup transaction.

At 404, the customer arrives at the lockbox location after the time specified in the transaction request confirmation details. In some embodiments, the passcode is a customer carried passcode, for example, a debit card with the financial institution that is swiped or scanned to gain access. In some arrangements, the customer carried passcode could be an electronic token submitted via NFC using a customer device, or a lockbox fob special issued by the financial institution to authenticate the lockbox transactions. In some embodiments, the passcode could be a PIN code, a barcode reader or a biometric scan of the customer.

Upon transmission of the passcode by the customer, at 406, the financial institution lockbox system 106 receives a customer passcode notification. The customer device 102 could transmit the passcode to the financial institution lockbox system 106 when in close proximity to the specified lockbox. Alternatively, the customer could enter the authentication information into the input terminal 201. In some arrangements a camera could be viewing the lockbox 148, allowing the financial institution to ascertain the customer's identity for any disputes or issues arising out of the transaction. In some arrangements, a camera is also placed inside of the lockbox 148 to monitor the transmission of the transaction funds.

At 408, the lockbox 148 unlocks. The transaction items inside the lockbox includes the currency amount request for a withdrawal, a currency repository for a deposit request, a second currency type of the amount requested for a currency exchange request, or a combination of the like.

At 410, the customer accesses the transaction items. In some arrangements involving a deposit request, the customer inserts the currency into a collection device. In other arrangements involving a deposit request, the currency can be placed inside the empty lockbox 148. In some embodiments involving a withdrawal transaction, the requested currency can be placed within the lockbox 148. In other arrangements, the lockbox 148 could have a ATM-like device, connected to a currency repository, that dispenses the requested currency amount. Upon receiving access to the transaction items, at 412, the customer completes the transaction with the lockbox 148 and closes it, the lockbox 148 re-locking. In some arrangements, the customer has to provide a signature or swipe a card issued by the financial institution to finalize and complete the transaction.

At 414, the lockbox 148 is checked to ensure that the completed transaction was done in accordance with the requested transaction. In some arrangements, this check is done by a financial institution employee at the lockbox location. In some arrangements, a processor is able to scan or sense the lockbox 148 and determine the lockbox details. In some embodiments, the sensor will inform the customer that the transaction is incomplete (e.g., not enough funds were deposited for an exchange, or currency was left in the lockbox in a withdrawal). The customer device 102 would receive a message indicating the deficiency and how the customer can fix the issue, for example, by returning to the lockbox and taking all of the funds.

At 416, a transaction confirmation is generated by the financial institution's lockbox system 106 and sent to the financial institution. The transaction confirmation includes relevant transaction details, such as the type of transaction that occurred, the amount of the transaction, the time window of the transaction, the actual time the transaction occurred and additional notes on the transaction. In some embodiments, it may include a video, from the cameras situated in the lockbox location, of the transaction occurring. In some arrangements, the picture of the customer could be take and sent with the confirmation details.

At 418, the financial institution receives the notification of the transaction confirmation from the lockbox 148 and determines whether or not the transaction was completed correctly, and in accordance with the request. If the transaction completed details show a short coming by the lockbox 148, the financial institution will try to rectify those issues moving forward. This may improve the customer experience with the service.

At 420, the financial institution finalizes the adjustment of the customer's financial account by the transaction amount, such as in the initial adjustment of step 308 of method 300 of FIG. 3. The transaction amount includes the requested amount to be withdrawn, deposited or exchanged, and also include fees associated with the transaction. Fees are associated with the financial institution processing the transaction and/or for use of the lockbox pickup service.

At 422, the financial institution compiles a confirmation and lockbox pickup transaction details message to send to the customer. The details can be similar to the details transmitted in step 416 of method 400. At 424, the customer receives the confirmation and lockbox pickup transaction details. The customer may receive the confirmation and lockbox pickup transaction details the next time he or she logs into his or her account, or it may be retrieved instantaneously through push notifications tied to the financial institution.

FIGS. 5A-5D illustrate an example graphical user interface ("GUI") 500 that may be utilized to submit a lockbox pickup transaction request, according to an example embodiment. For example, the GUI 500 may be displayed to the customer via the customer computing system 102 of FIG. 1. The GUI 500, for example, may be the GUI 500 related to the lockbox banking circuit 118 (e.g., the GUI of the financial institution lockbox smartphone application, the GUI of the financial institution lockbox website, etc.). The GUI 500 may be utilized in connection with the method 300 of FIG. 3 and the method 400 of FIG. 4, according to example embodiments. For example, the customer may utilize the GUI 500 to submit a lockbox pickup transaction request, via method 300. As another example, the customer may utilize the GUI 500 to receive a lockbox pickup transaction request confirmation from the financial institution and complete the lockbox pickup transaction, via method 400. However, it should be understood that the GUI 500 may similarly be utilized on other devices to conduct lockbox pickup transactions.

Figure 5A:
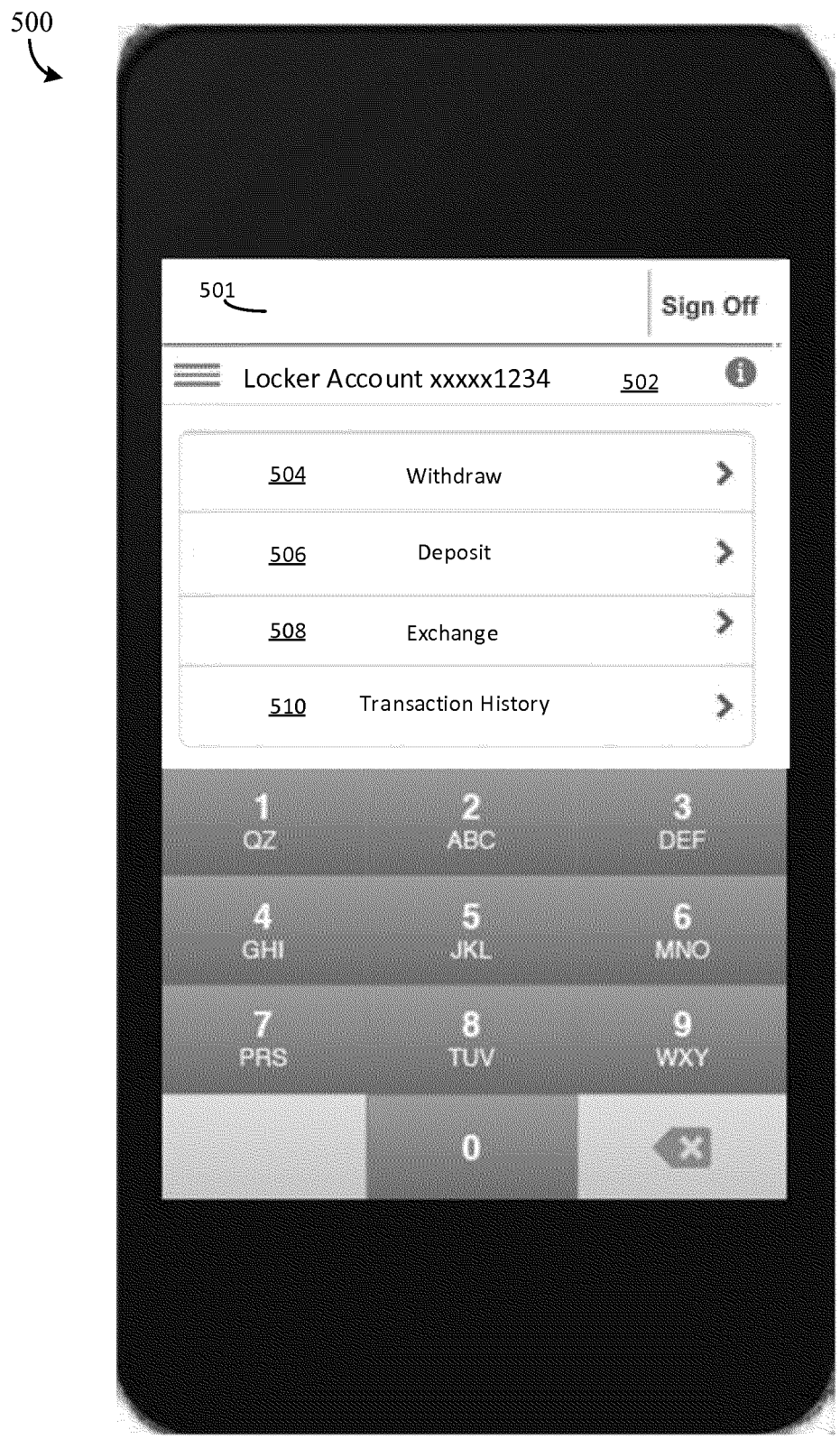
FIGS. 5A-5D illustrate display screens that may be displayed to the user during the process of FIG. 3 and FIG. 4.

FIG. 5A illustrates a menu page 501 of the GUI 500, according to an embodiment. The GUI 500 includes a mobile banking interface that is displayed to the customer after accessing the lockbox banking circuit 118 that has been installed on the customer computer system 102. In another embodiment, the GUI 500 is similarly be accessed via an online banking website. Upon accessing the GUI 500, the customer is prompted to provide login credentials to gain access to the account with the financial institution. By providing such credentials, the customer is provided with the full functionality of the online banking system in the lockbox banking circuit. In an example embodiment, the menu page 501 includes a plurality of menu option for the customer's specific fiat currency financial account 502. In this example, the customer is authorized to execute lockbox pickup services from the customer's fiat currency financial account. The menu page 501 includes several menu buttons labeled with a corresponding action. For example, the menu buttons include a withdraw button 504, a deposit button 506, an exchange button 508, and a transaction history 510 button.

Figure 5B:
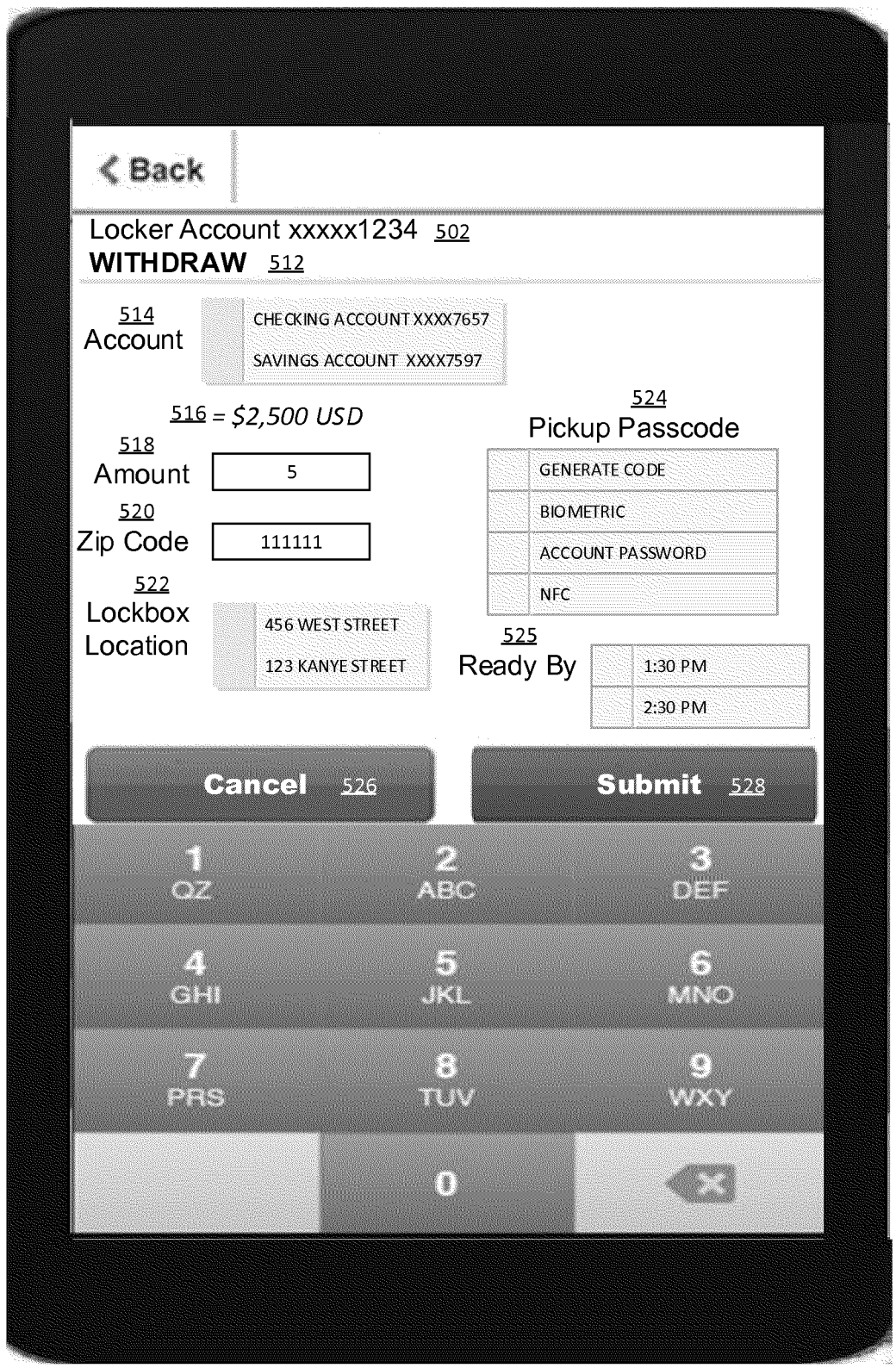

Referring now to FIG. 5B, a lockbox pickup service withdraw funds page 512 of the GUI 500 of FIG. 5A is illustrated. For example, the lockbox pickup service withdraw funds page 512 is displayed in response to a customer selection of the withdraw button 504 on the menu bar provided in FIG. 5A. The lockbox pickup service withdraw funds page 512 provides the customer a plurality of fields to easily facilitate receiving cash, lockbox pickup at a lockbox location. According to an embodiment, the lockbox pickup service withdraw funds page 512 includes a source account field 514, a source account balance field 516, an amount field 518, a zip code field 520, a lockbox location field 522, a pickup passcode field 524, and a ready by field 525.

The source account field 514 defines which account the customer would like to use to complete the transaction. This could be, for example, the checking account for which the customer would like the withdrawn funds to be taken from. In some arrangements, the source account field 514 is defaulted to the account that was originally selected to begin the lockbox pickup service transactions, for example the specific fiat currency financial account 502 as shown in FIG. 5A. The customer may change the source account fund to another fiat currency financial account with the financial institution, which may cause the specific fiat currency financial account 502 to update to the newly selected option.

The source account balance field 516 displays the amount of available funds in the selected account in the source account field 514. The source account balance field 516 will update, in real-time, the balance depending on the account selected by the customer. The amount field 518 displays how much the customer would like to use in the selected lockbox pickup transaction. For example, the customer selects to withdraw from the selected account 10 U.S.D. In some arrangements, the amount field 518 will only allow the customer to enter an amount less than or equal to the source account balance field 516. In some arrangements, when the customer selects the withdraw option and enters the amount of currency to be withdrawn, the customer gets an additional field that allows the customer to enter the denominations of each value of currency he or she would like. For example, if the customer requests to withdraw 30 U.S.D. from the checking account, an additional field may allow the customer to designate that he or she receives one ten dollar bill and one twenty dollar bill.

The zip code field 520 allows the customer to enter the zip code for the area in which he or she would like to find a financial institution lockbox location to complete the transaction. In some arrangements, the customer is able to enter a full address in the zip code field 520 to provide for more accurate location matching by the financial institution. The lockbox location field 522 is a drop down menu of all the lockbox locations within the customer entered zip code. In some arrangements, the lockbox location field 522 is updated in real-time, in response to the value entered in the zip code field 522. In other arrangements, the lockbox location field 522 updates in response to the customer entering in a desired pickup time in the field, at 525.

The pickup passcode field 524 allows the customer to choose which form of authentication to be used by the lockbox location on the subsequent lockbox pickup transaction by the customer. As shown in FIG. 5B, the customer may require that the financial institution email a one-time passcode to the customer's email address, that the customer provide a biometric sample, that the customer provide an multi-use account password, or that the customer be able to utilize near field communication to authenticate.

The ready by field 525 allows the customer to enter the date that the customer would like to complete the lockbox pickup transaction. In some arrangements, the lockbox location field 522 updates, in real-time, in response to the pickup date options displayed in the field 526. In some embodiments, the pickup date field 526 is a drop down option menu, the options responsive to the transaction type and selected lockbox location. In other arrangements, the customer may enter in a the date, in some format, for example MM/DD/YYYY.

The customer may choose to approve the transaction displayed by selecting the "Submit" button 528, or the customer may cancel the transaction request via the "Cancel" button 526. In some embodiments, either selection leads to an additional confirmation prompt by the application, for example as shown in FIG. 5C.

Figure 5C:
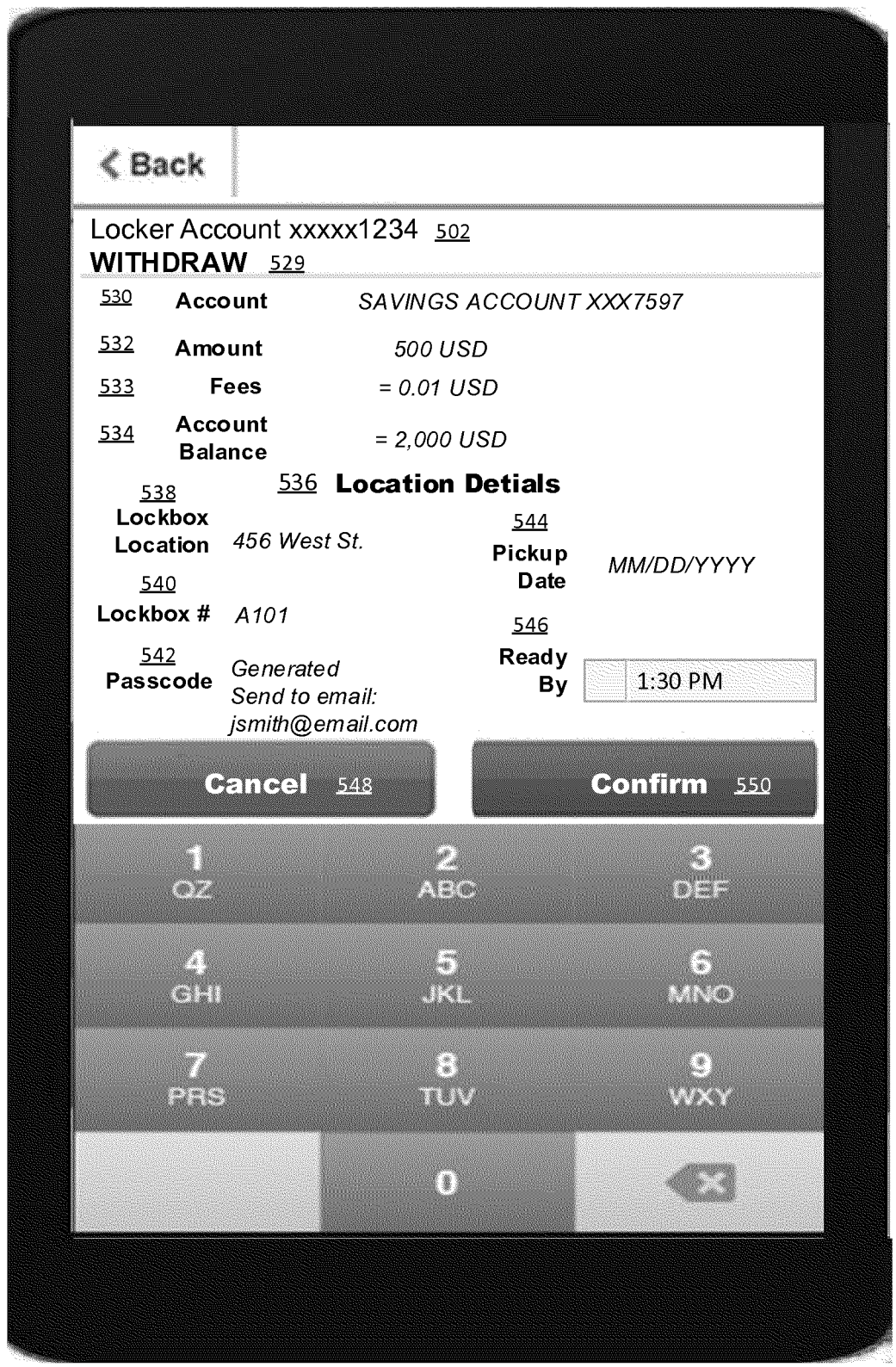

Referring now to FIG. 5C, a lockbox pickup service withdraw funds request summary page 529 of the GUI 500 of FIG. 5A is illustrated. For example, the withdraw funds request summary page 529 is displayed in response to a customer selection of the "confirm" button on the button bar provided in FIG. 5B. The withdraw funds request summary page 529 provides the customer a plurality of fields that summarize the details regarding the request submission, and reflects availability changes. According to an embodiment, the withdraw funds request summary page 529 includes a source account field 530, a transaction amount field 532, a fees field 533, a source account balance field 534, and a location details field 536.

The source account field 530, the transaction amount field 532 and the source account balance field 534 display the information entered into the withdraw funds page 512 as shown in FIG. 5B. The fees field 533 of the GUI 500 displays fees associated with the transaction. The fees may be associated with one or both of the financial institution and the MBC partner. The transaction amount field 532 is the total transaction amount in fiat currency that the customer's account will be debited upon executing the transaction. The total transaction amount may include the requested amount to be transmitted to the recipient, and also any fees associated with the transaction.

The location details field 536 includes the relevant information for the customer to arrive at the proper lockbox location and complete the transaction. The location details field includes a plurality of fields that summarize the location details and includes a lockbox location field 538, a lockbox number field 540, a passcode field 542, a pickup date field 544 and a ready by field 546. The lockbox location field 538 is the customer selected option from the drop down menu of all the lockbox locations within the customer entered zip code. The lockbox number field 540 is generated by the financial institution once the request has been received and approved. The lockbox number field 540 is the lockbox that the customer can access and complete the transaction. The passcode field 542 displays the customer's selection for the form of authentication to be used by the lockbox location on the lockbox pickup transaction. For example, the customer may have requested that the financial institution email a one-time password to the customer's email address, such as "jDoe@email.com" as shown in FIG. 5C.

The pickup data field 544 displays the customer's choice of the date that the customer would like to complete the lockbox pickup transaction. In some arrangements, the date is a result of the financial institution choosing the best date based on a multiple date options selected by the customer in a previous menu. The pickup time field 546 displays the time at which the customer would like the lockbox to be ready to complete the transaction.

The customer may choose to approve the transaction displayed by selecting the "Confirm" button 550, or the customer may cancel the transaction request via the "Cancel" button 548. In some embodiments, either selection may lead to an additional confirmation prompt by the application.

Figure 5D:
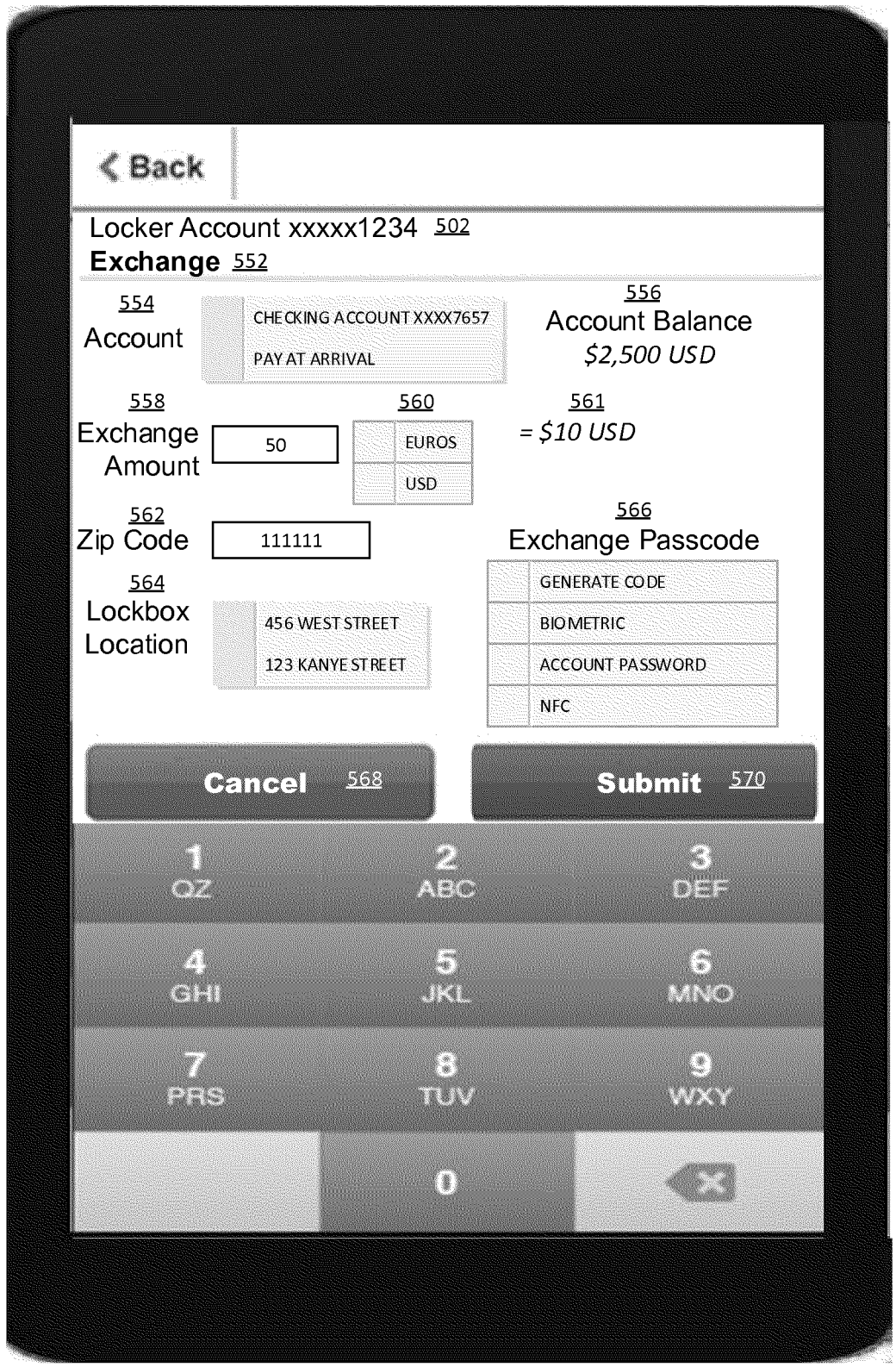

Referring now to FIG. 5D, a lockbox pickup service exchange funds page 552 of the GUI 500 of FIG. 5A is illustrated. For example, the lockbox pickup service exchange funds page 552 is displayed in response to a customer selection of the exchange button 508 on the menu bar provided in FIG. 5A. The lockbox pickup service exchange funds page 552 provides the customer a plurality of fields to easily facilitate receiving cash, lockbox pickup at a lockbox location. According to an embodiment, the lockbox pickup service exchange funds page 552 includes a source account field 554, a source account balance field 556, an exchange amount field 558, a foreign currency type 560, an equivalent amount field 561, a zip code field 562, a lockbox location field 564, and an exchange passcode field 566.

The source account field 554 defines which account the customer would like to use to complete the transaction. This could be, for example, the checking account for which the customer would like the exchange funds to be taken from. In some arrangements, the source account field 554 is defaulted to the account that was originally selected to begin the lockbox pickup service transactions, for example the specific fiat currency financial account 502 as shown in FIG. 5A. The customer may change the source account fund to another fiat currency financial account with the financial institution, which causes the specific fiat currency financial account 502 to update to the newly selected option. In some arrangements, the customer may select to pay for the exchange upon arrival at the lockbox location. For example, the customer could provide 100 U.S.D. in cash at the lockbox pickup location to the lockbox in exchange for the equivalent amount.

The source account balance field 556 displays the amount of available funds in the selected account in the source account field 502. The source account balance field 556 can update, in real-time, the balance depending on the account selected by the customer. The exchange amount field 558 displays how much the customer would like to use in the exchange currency lockbox pickup transaction. For example, the customer selects to exchange from the selected account 100 U.S.D. In some arrangements, the exchange amount field 558 will only allow the customer to enter an amount less than or equal to the source account balance field 556. In some arrangements, when the customer selects the exchange option and enters the exchange amount 558 of currency to be exchanged, the customer may get an additional field that allows the customer to enter the denominations of each value of currency he or she would like to end up with at the completion of the exchange. For example, if the customer requests to exchange 50 U.S.D. from the checking account for the equivalent amount of a foreign currency, for example euros, an additional field allows for the customer to designate that he or she receives five €2 coins.

The equivalent amount field 561 of the GUI 500 displays an amount in the customer's primary fiat currency (e.g., U.S.D.) that is equivalent to the amount of foreign currency requested in the exchange amount field 558 and the currency type in the currency type field 560. For example, as shown in FIG. 5D, if the U.S.D. amount in the amount field 558 is 50 U.S.D., the equivalent amount field 561 of the GUI 500 displays the amount of euro currency equivalent to the requested amount of U.S.D. In some arrangements where the customer selects to receive an amount of the foreign currency, the equivalent amount field 561 displays how much U.S.D currency is required to complete the exchange.

The zip code field 562 allows the customer to enter the zip code for the area in which he or she would like to find a financial institution lockbox location to complete the transaction. In some arrangements, the customer is be able to enter a full address in the zip code field 562 to provide for more accurate location matching by the financial institution. The lockbox location field 564 is a drop down menu of all the lockbox locations within the customer entered zip code. In some arrangements, the lockbox location field 564 is updated in real-time, in response to the value entered in the zip code field 562. In some arrangements, the lockbox location field 564 may be limited due to lockbox locations lacking the currency type that the customer wants to exchange the U.S.D. for. In other arrangements, the lockbox location field 564 updates in response to the customer entering in a desired pickup date and pickup time in provided fields (not pictured).

The customer may choose to approve the transaction displayed by selecting the "Submit" button 520, or the customer may cancel the transaction request via the "Cancel" button 518. In some embodiments, either selection may lead to an additional confirmation prompt by the application.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
    receiving, by a financial institution computing system of a financial institution, a lockbox transaction request from a user device associated with an account holder of the financial institution, the lockbox transaction request including a transaction identification, a transaction time, and a transaction location, the transaction identification comprising an amount of a physical currency type and an indication of at least one denomination of the amount of the physical currency type, the transaction time being a desired time of a transaction, and the transaction location being a desired location of the transaction;
    determining, by the financial institution computing system, a lockbox location that can complete the lockbox transaction request from a plurality of lockbox locations associated with the financial institution based on the transaction identification, the transaction time, and the transaction location, each of the plurality of lockbox locations having a plurality of physical lockboxes;
    prior to receiving approval of the lockbox location from the user device, transmitting, by the financial institution computing system, the lockbox location to the user device;
    receiving, by the financial institution computing system, approval of the lockbox location from the user device;
    transmitting, by the financial institution computing system, a withdrawal service call to the approved lockbox location, the withdrawal service call including instructions to prepare the amount of the physical currency type according to the indication of the at least one denomination of the amount of the physical currency type in a physical lockbox of the plurality of physical lockboxes associated with the approved lockbox location and to lock the physical lockbox;
    configuring, by a lockbox computing system associated with the approved lockbox location, the physical lockbox, wherein configuring the physical lockbox is based on the transaction identification and comprises loading the physical lockbox with the amount of the physical currency type according to the indication of the at least one denomination of the amount of the physical currency type and locking a door of the physical lockbox, wherein the loading of the physical lockbox is performed automatically via an automated dispenser operably coupled to a currency repository; and
    transmitting, by the financial institution computing system, transaction information to the user device, wherein the transaction information includes the approved lockbox location, lockbox unlock information, and a lockbox number, the lockbox number identifying the physical lockbox, wherein the lockbox unlock information is sufficient to unlock the door of the physical lockbox.

2. The method of claim 1, wherein the transaction identification further comprises a currency exchange and the amount of the physical currency type includes a first amount of a first currency type and a second amount of a second currency type, the second amount of the second currency type being what the account holder must provide to acquire the first amount of the first currency type, further comprising:
transmitting, by the financial institution computing system, an exchange service call to the lockbox location, the exchange service call including instructions to an employee at the lockbox location to ready the first amount of the first currency type;
wherein the currency repository comprises at least the first amount of the first currency type; and
wherein the physical lockbox is configured to accept the first amount of the first currency type and provide the second amount of the second currency type.

3. The method of claim 1, further comprising, transmitting, by the financial institution computing system, a transaction ready notification to the user device, the transaction ready notification indicating that the transaction information is ready to be completed at the lockbox location.

4. A method comprising:
receiving, by a lockbox computing system of a financial institution, a transaction service request from a financial institution computing system associated with the financial institution, wherein the transaction service request includes a transaction identification, a transaction time, a transaction location, and a lockbox locking passcode, the transaction identification comprising an amount of a physical currency type and an indication of at least one denomination of the amount of the physical currency type, the transaction time being a desired time of a transaction, and the transaction location being a desired location of the transaction;
determining, by the lockbox computing system, a lockbox location that can complete the transaction service request based on the transaction identification, the transaction time, and the transaction location, the lockbox location being determined from a plurality of lockbox locations associated with the financial institution, each of the plurality of lockbox locations having a plurality of physical lockboxes;
configuring, by the lockbox computing system, a physical lockbox of the plurality of physical lockboxes of the determined lockbox location, wherein configuring the physical lockbox is based on the transaction identification and comprises loading the physical lockbox with the amount of the physical currency type according to the indication of the at least one denomination of the amount of the physical currency type and locking a door of the physical lockbox based on the lockbox locking passcode, wherein the loading of the physical lockbox is performed automatically via an automated dispenser operably coupled to a currency repository;
receiving, by the lockbox computing system, an unlock attempt;
authenticating, by the lockbox computing system, the unlock attempt, wherein authentication occurs by comparing the unlock attempt to the lockbox locking passcode; and
transmitting, by the lockbox computing system, an unlock command to the physical lockbox to unlock the door of the physical lockbox based on the authentication, the unlocked physical lockbox providing access to the amount of the physical currency type.

5. The method of claim 4, further comprising:
validating, by the lockbox computing system, that the amount of the physical currency type is removed from the physical lockbox.

6. The method of claim 4, further comprising, transmitting, by the lockbox computing system, a pickup request to the financial institution computing system, wherein the pickup request is a request to retrieve the amount of the physical currency type inside the physical lockbox.

7. The method of claim 4, wherein the transaction identification further comprises a currency exchange and the amount of the physical currency type further includes a first amount of a first currency type and a second amount of a second currency type, the second amount of the second currency type being what must be provided to acquire the first amount of the first currency type, further comprising:
validating, by the lockbox computing system, the second amount of the second currency type is inside the physical lockbox.

8. The method of claim 4, wherein the lockbox locking passcode is one of a password string, NFC, fob, or biometric scan.

9. The method of claim 4, further comprising, transmitting, by the lockbox computing system, a ready notification to a user device associated with an account holder of the financial institution.

10. The method of claim 4, further comprising:
generating, by the lockbox computing system, a transaction details summary, the transaction details summary confirming the unlock command of the transaction service request; and
transmitting, by the lockbox computing system, a notification of completed transaction and transaction details to the financial institution computing system.

11. The method of claim 4, wherein transmitting the unlock command further includes a recording command to a recording device.

12. A physical lockbox comprising:
a content verification circuit operably coupled to a sensor configured to detect removal of an amount of physical currency from the physical lockbox;
a currency dispensing device operably coupled to a currency repository and configured to automatically load the amount of physical currency into the physical lockbox;
an access control device operably connected to a lock and an input device, the lock operably connected to a door of the physical lockbox, the lock preventing the door from opening and providing access to the physical lockbox when the lock is locked and the lock allowing the door to open and provide access to the physical lockbox when the lock is unlocked, the input device structured to receive an unlock attempt from a user, the access control device comprising:
a network interface configured to communicate data to and from a lockbox and an authentication computing system over a network; and
a processing circuit structured to:
upon the loading of the amount of physical currency into the physical lockbox by the currency dispensing device:

receive a first lock command, the first lock command locking the physical lockbox and preventing access to the amount of physical currency located within the physical lockbox;
receive the unlock attempt from the user;
authenticate the unlock attempt;
transmit an unlock command to the lockbox based on the authentication; and
upon detection of the removal of the amount of physical currency from the physical lockbox by the sensor of the content verification circuit, receive a second lock command, the second lock command re-locking the physical lockbox.

13. The lockbox of claim 12, wherein the input device is at least one of a keypad, a biometric sensor, or a card reader.

14. The lockbox of claim 12, wherein the sensor is inside the lockbox, the sensor further structured to determine contents inside the lockbox.

15. The lockbox of claim 12, further comprising a camera connected to the lockbox, the camera structured to record a transaction.

16. A computing system associated with a financial institution, the computing system comprising:
   a lockbox database having information relating to the use and availability of a plurality of physical lockboxes at a plurality of lockbox locations;
   a network interface configured to communicate data to and from a lockbox computing system associated with the financial institution and a user device associated with a user over a network; and
   a lockbox management circuit structured to:
   receive a lockbox transaction request from the user device associated with an account holder of the financial institution, the lockbox transaction request including a transaction identification, a transaction time, and a transaction location, the transaction identification comprising an amount of a physical currency type and an indication of at least one denomination of the amount of the physical currency type, the transaction time being a desired time of a transaction, and the transaction location being a desired location of the transaction;
   determine a lockbox location that could complete the lockbox transaction request from the plurality of lockbox locations associated with the financial institution based on the transaction identification, the transaction time, and the transaction location;
   prior to receiving approval of the lockbox location from the user device, transmit the lockbox location to the user device;
   receive approval of the lockbox location from the user device;
   transmit a withdrawal service call to the approved lockbox location, the withdrawal service call including instructions to prepare the amount of the physical currency type according to the indication of the at least one denomination of the amount of the physical currency type in a physical lockbox associated with the approved lockbox location and to lock the physical lockbox;
   configure the physical lockbox, wherein configuring the physical lockbox is based on the transaction identification and comprises loading the physical lockbox with the amount of the physical currency type according to the indication of the at least one denomination of the amount of the physical currency type and locking a door of the physical lockbox, wherein the loading of the physical lockbox is performed automatically via an automated dispenser operably coupled to a currency repository; and
   transmit a transaction information to the user device, wherein the transaction information includes the approved lockbox location, lockbox unlock information and a lockbox number, the lockbox number being the physical lockbox associated with the approved lockbox location, wherein the lockbox unlock information is sufficient to unlock the door of the physical lockbox.

* * * * *